July 11, 1933.  F. W. COTTERMAN  1,917,501
AUTOMATIC FREEWHEELING TRANSMISSION MECHANISM
Filed Aug. 5, 1931  4 Sheets-Sheet 3
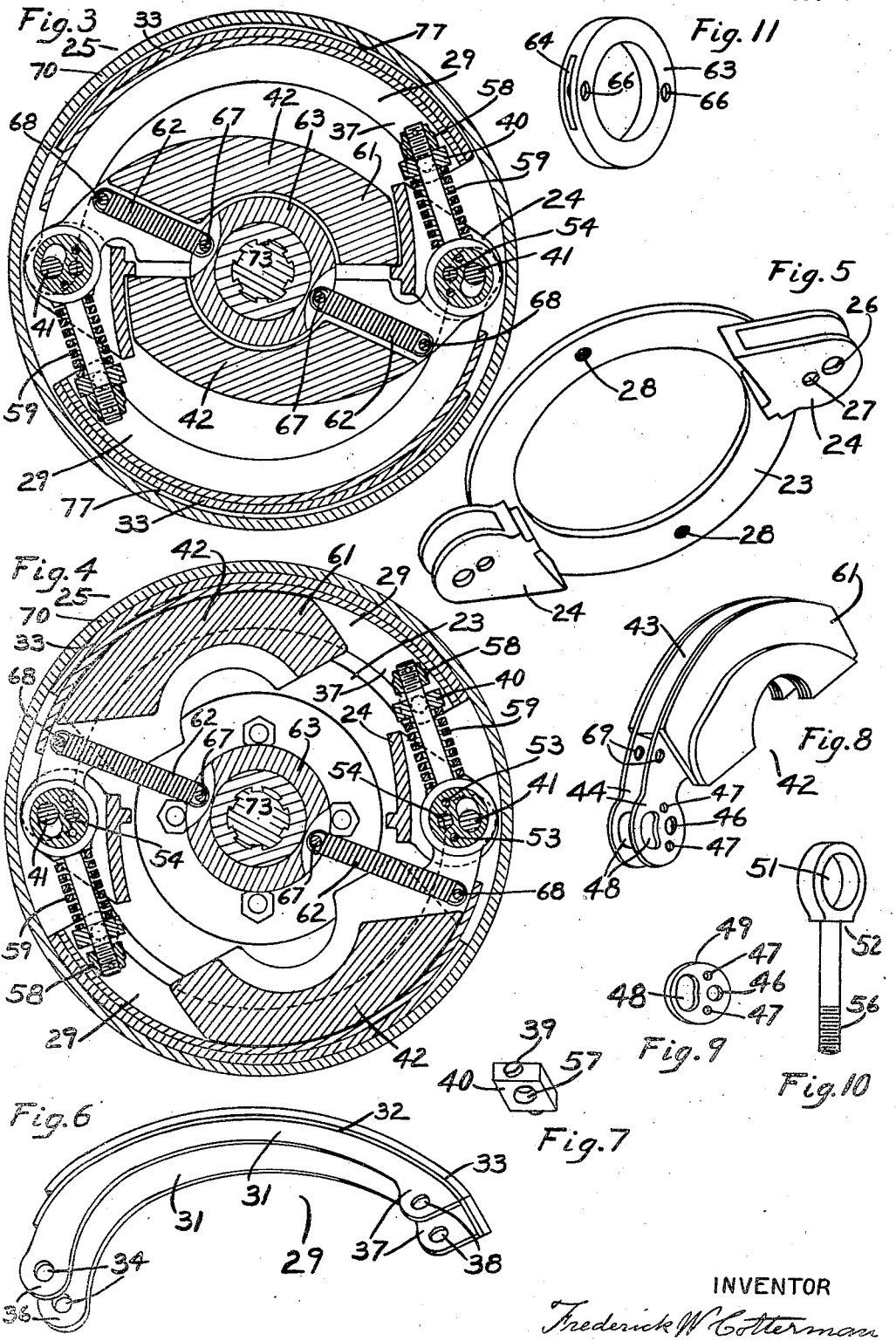
INVENTOR
Frederick W Cotterman July 11, 1933.    F. W. COTTERMAN    1,917,501
AUTOMATIC FREEWHEELING TRANSMISSION MECHANISM
Filed Aug. 5, 1931    4 Sheets-Sheet 4

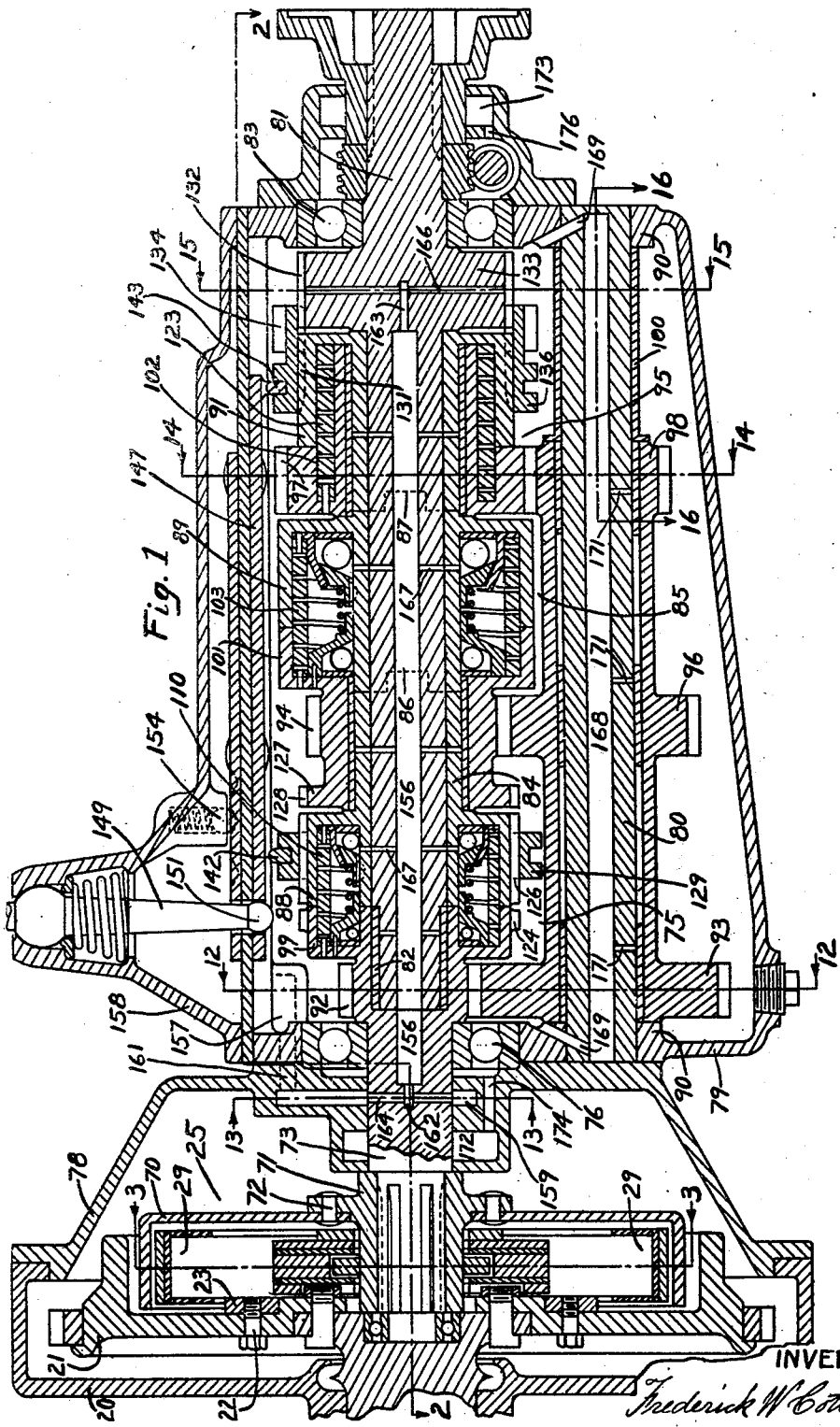

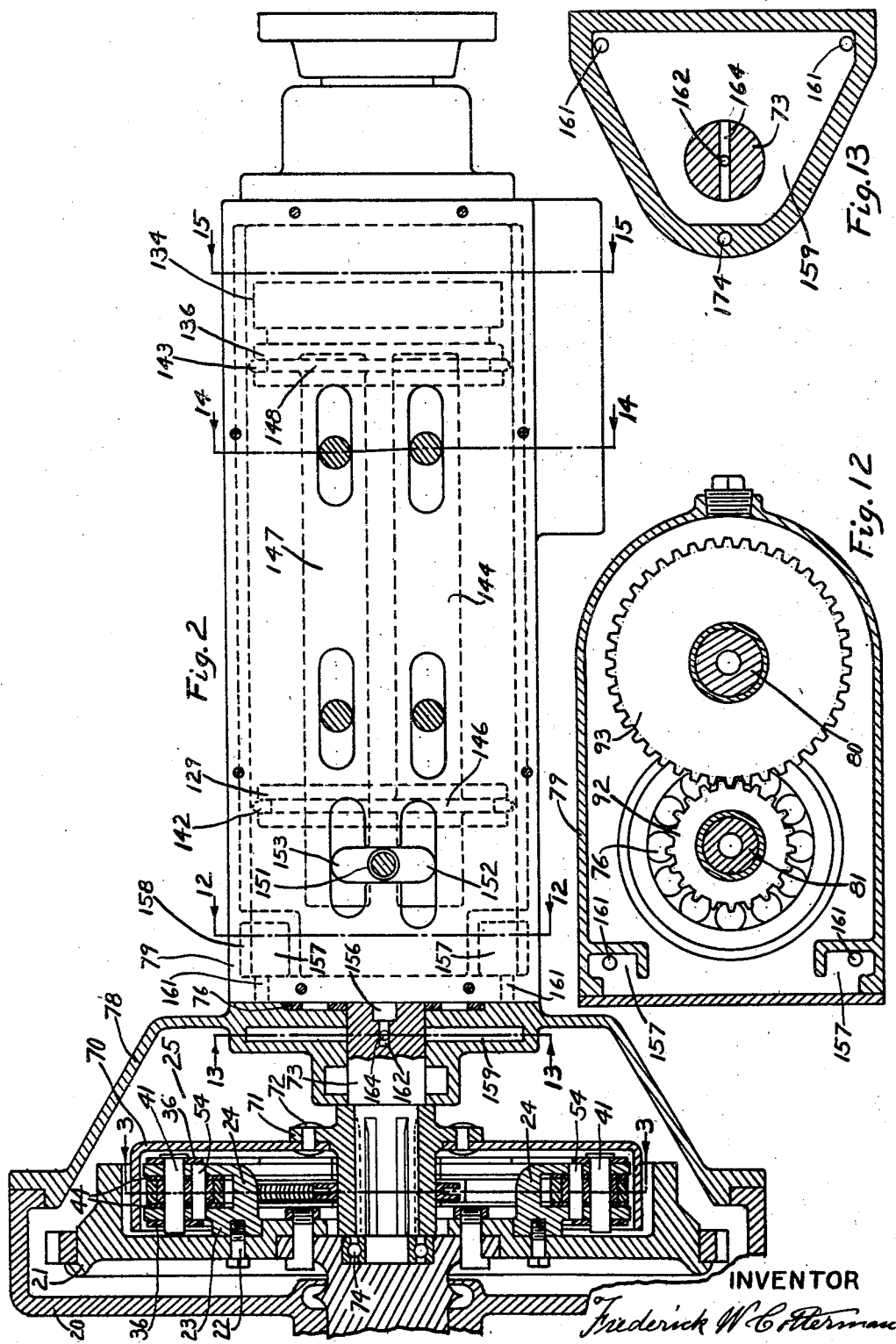

INVENTOR
Frederick W. Cotterman

Patented July 11, 1933

1,917,501

UNITED STATES PATENT OFFICE

FREDERICK W. COTTERMAN, OF DAYTON, OHIO, ASSIGNOR OF ONE-HALF TO VINCENT G. APPLE, OF DAYTON, OHIO; HERBERT F. APPLE, EDWARD M. APPLE, AND GOURLEY DARROCH EXECUTORS OF SAID VINCENT G. APPLE, DECEASED

AUTOMATIC FREEWHEELING TRANSMISSION MECHANISM

Application filed August 5, 1931. Serial No. 555,186.

This invention relates to transmission mechanism for automotive use and is particularly applicable to motor vehicles.

An object of the invention is to provide transmission mechanism having both "free-wheeling" and "conventional" characteristics and so arranged that when the conventional H control lever is operated to any of its several speed-changing positions, free-wheeling is automatically eliminated, but when the H control lever is placed in the neutral position and left there, both free-wheeling and automatic gear shifting is thereby provided, to the end that the transmission may be shifted through its entire range of forward speed changes by mere manipulation of the accelerator pedal.

Another object is to eliminate the conventional foot operated clutch and replace it with an automatically operable centrifugal clutch of special design which will open and disconnect the engine whenever it settles to its idling speed, to the end that the vehicle may be started and stopped entirely by controlling the fuel supply with the accelerator pedal.

Still another object is to provide unique oiling mechanism to supply oil to a central opening in a rotatable shaft.

That these and other objects are attained will be apparent from a consideration of the following description reference being had to the accompanying drawings wherein, Fig. 1 is a vertical axial section through the transmission mechanism.

Fig. 2 is a horizontal section taken on the line 2—2 of Fig. 1.

Fig. 3 is a transverse section through the centrifugal clutch taken at 3—3 of Fig. 1 or 2, showing the clutch unoperated as when the engine is revolving at its idling speed.

Fig. 4 shows the same section as Fig. 3 except that the clutch members are shifted to the positions which they assume when the engine is revolved at a speed somewhat higher than its idling speed.

Figs. 5 to 11 inclusive are perspective views of the principal clutch members unassembled.

Figs. 12 to 15 inclusive are transverse sections taken at 12—12 to 15—15 respectively of Fig. 1 or 2.

Figure 14:
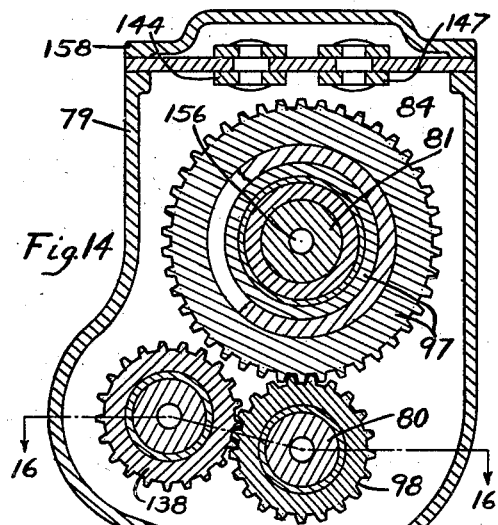
Figure 15:
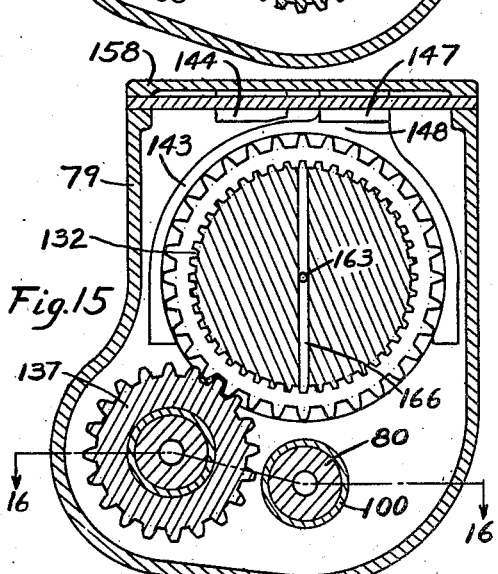
Figure 16:
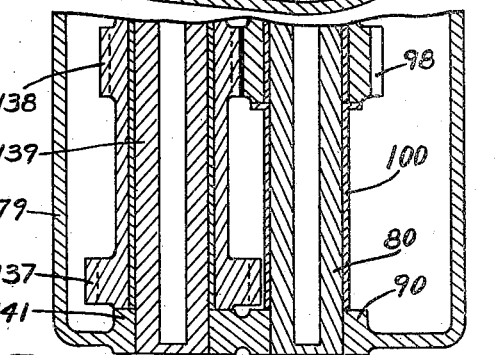

Fig. 16 is a horizontal section taken at 16—16 of Figs. 14, 15 or 1.

Figure 17:
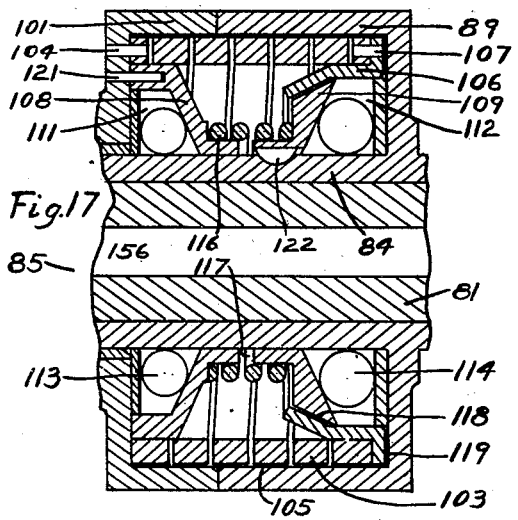

Fig. 17 is a portion taken from Fig. 1 and enlarged, and shows the intermediate "free-wheeling-automatic-speed-changing" clutch in its unoperated state.

Figure 18:
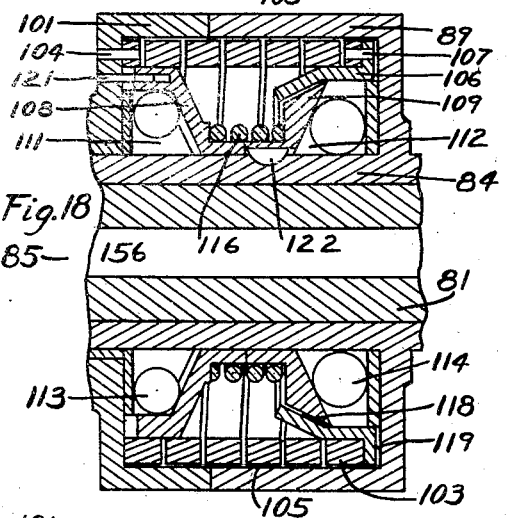
Figure 19:
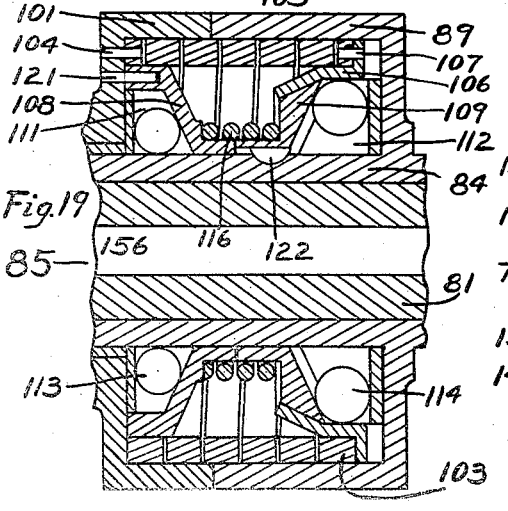

Figs. 18 and 19 show the same section as Fig. 17 except that the members of the clutch are shifted to other positions.

Similar numerals refer to similar parts throughout the several views.

Before proceeding with a description of the structural details of the transmission a brief description of its general structure and what is accomplished by it may be beneficial. To this end it may be stated that until the speed of the engine is brought up somewhat higher than its idling speed, none of the transmission gears revolve. At about 100 R. P. M. above the normal idling speed of the engine the centrifugal clutch engages and low gear is made effective. Low gear may be continued in effect through the entire speed range of the engine, that is, the vehicle may be driven in low gear at a speed of from 2 to about 18 M. P. H.

It is not possible to cause automatic shifting from low to intermediate gear until the vehicle is moving eight or more M. P. H. But if the vehicle is moving eight or more M. P. H. in low gear and the accelerator pedal is released for approximately one second, so that free-wheeling momentarily takes place, then, when the accelerator pedal is again depressed, the transmission will be in intermediate gear. Now when the transmission is once in intermediate gear, it may be kept there over the entire speed range of the engine, that is, when the transmission is in intermediate gear the vehicle may be varied from about four to thirty-six M. P. H. But if the vehicle is being driven with the transmission in intermediate gear and it reaches a speed of sixteen or more M. P. H., and the accelerator pedal is released for approximately one second, so that free-wheeling is momentarily effected, and then again depressed, the transmission will be in high gear.

It is considered important that the M. P. H.

at which shifting from low to intermediate and from intermediate to high, takes place, may be varied to suit the individual driver, for while one driver may wish to shift from low to intermediate at eight M. P. H. and from intermediate to high at sixteen M. P. H. another driver may wish to shift from low to intermediate at sixteen M. P. H. and from intermediate to high at thirty-two M. P. H.

It is also considered important that the standard H control gear shift lever is maintained, and that by its use the transmission may be shifted to intermediate gear or to high gear, and when so shifted by the H control lever there is no free-wheeling. This is considered a desirable feature when traveling hilly country, since the engine may be thus made to act as a brake to retard the vehicle. Whether the driver has conventional gear shifting without free-wheeling, or automatic gear shifting with free-wheeling depends merely upon whether he operates the H control lever or leaves it in a central position. But while the three forward speeds may be made operative by merely manipulating the accelerator pedal, reversing of the vehicle may not be accomplished except by shifting the H control lever.

The centrifugal clutch is located in the position occupied by the foot operated clutch of a conventional automotive vehicle, and the flywheel cover which encloses the clutch is substantially that of standard practice. The transmission housing is supported on the flywheel cover in the usual manner. Within the transmission housing are the usual two parallel shafts, the upper main shaft being rotatable and the lower countershaft being stationary, also as in standard practice. There are three pairs of constant mesh gears joining the main shaft and the countershaft providing forward speeds, and a sliding gear with suitable idlers for reversing. There are three coil-spring-free-wheeling clutches adjacent the three pairs of constant mesh gears. Two of these spring clutches operate automatically upon manipulation of the accelerator pedal, one of them for shifting from low to intermediate and the other for shifting from intermediate to high.

Within the flywheel housing 20 of a conventional automotive engine of the Otto-cycle type is the usual flywheel 21 which carries the rotatable and operable parts of the centrifugal clutch 25. This clutch is shown in vertical axial section in Fig. 1, in horizontal axial section in Fig. 2, in transverse section in Figs. 3 and 4 and in detail in Figs. 5 to 11 inclusive. The transverse section Fig. 3 shows the clutch unoperated while Fig. 4 shows the clutch when fully operated.

Secured to the flywheel 21 by the bolts 22 is the clutch carrier ring 23 (see Fig. 5), having two bifurcated ears 24. Each ear 24 has hinge pin holes 26 and 27 for hinging the clutch shoes and the shoe operating weights respectively. Tapped holes 28 are provided for the bolts 22 which secure the carrier ring to the flywheel 21. One carrier ring 23 only is required.

The clutch shoes 29 are preferably made up of two stamped curved sheet metal side plates 31 joined to a bent metal strip 32. A facing 33 of ordinary brake lining material is secured to the outside of the bent metal strip 32. Hinge pin holes 34 extend through the side plates at the hinge ends 36 while at the other ends 37 of the plates the holes 38 are provided for the trunnions 39 of the swivel block 40, Fig. 7. The swivel block 40 must be placed between the plates 31 before they are united to the curved strip 32. Two shoes 29 are required and they are assembled with the hinge ends 36 over the outside of the ears 24 of the carrier ring 23 and are swingably held thereto by the hinge pins 41. (See Fig. 2.)

The shoe operating weights 42, Fig. 8, are preferably also made up of a series of sheet stampings curved at 43 to lie snugly to the inside of the shoes 29 when the weights are swung outwardly to their most extended positions as when the clutch is fully operated as in Fig. 4. Two of the stampings are extended to provide hinge ends 44 which have the weight hinge pin holes 46, the rivet holes 47, and oblong clearance holes 48 to permit movement of the weights about the shoe hinge pins 41.

An eccentric 49, Fig. 9, fits between the hinge ends 44 and has holes corresponding to those on the hinge ends 44 and are designated by the same numerals. The opening 51 of a connecting rod 52, Fig. 10, fits freely around the eccentric 49. An eccentric 49 is placed in the opening 51 of a connecting rod 52, and placed between the hinge ends 44 and permanently secured by rivets 53 extending through the rivet holes 47. Two of the operating weights 42 are required, and their hinge ends fit inside the bifurcated ears 24 and are swingably held thereto by the hinge pins 54. (See Fig. 2.) The threaded ends 56 of the connecting rods pass through the holes 57 in the swivel blocks 40 of the shoes 29. Nuts 58, on the threaded ends 56, on the one side of the swivel blocks 40 and heavy compression springs 59 on the other side restrain movement of the connecting rods 52 through the holes 57. It will be seen that when the free ends 61 of the weights 42 swing outwardly, the eccentrics 49 are rotated about their hinge pins 54, which operates the free ends 37 of the shoes 29 outwardly away from the axis of the clutch. Two coil extension springs 62 restrain outward movement of the weights 42. A collar 63, Fig. 11, having cuts 64 in opposite edges, and pin holes 66 by which pins 67 are carried, provides anchorage for the inner ends of the springs 62, the outer ends of the springs being held by pins 68 passing through holes 69 in the weights 42.

The clutch drum 70 surrounds the shoes 29 and is held to the hub 71 by rivets 72. Hub 71 is multiple splined to the drive pinion shaft 73 which is supported at opposite ends by bearings 74 and 76 in the usual manner. When the weights 42 lie closely to the hub 71 there is a slight space 77 between the facing 33 and the drum 70 as in Fig. 3 and the clutch is disengaged, but when the weights 42 move outwardly and lie closely to the inside of the shoes 29 the shoes are held tightly to the drum 70 and the clutch is engaged. The eccentrics 49 are of such throw that an outward movement of a weight 42 of one inch produces an outward movement of a shoe 29 of one-tenth of an inch. The nuts 58 are so adjusted that the shoes 29 contact the drum 70 when the weights 42 have moved only part of their full travel. The springs 59 then yield to permit the weights 42 to move outwardly through the remainder of their travel. Each weight 42 operates the shoe 29 opposite to the one within which it nests. The flywheel cover 78 encloses the centrifugal clutch 25, and the transmission housing 79 is supported on the flywheel cover.

Within the transmission housing 79 the main shaft 81 at one end has rotative bearing in the end of the drive pinion shaft at 82, and at the other end in the bearing 83. The countershaft 80 is held against rotation in the hubs 90, which are located one at each end of the housing. The high speed spring clutch broadly designated by the numeral 75, the intermediate spring clutch broadly designated by the numeral 85, and the low speed spring clutch broadly designated by the numeral 95 surround the main shaft 81 between spaced apart pairs of gears. Immediately surrounding the main shaft 81 is the spring clutch sleeve 84. Solely to facilitate assembly, the spring clutch sleeve 84 is divided into three lengths which are end splined together at 86 and 87, but for clearness of description the spring clutch sleeve 84 will be referred to as a single part.

Spring clutch sleeve 84 has integral therewith, and spaced apart along its length, the high speed spring clutch cup 88, the intermediate spring clutch cup 89 and the low speed spring clutch cup 91. These three cups always rotate in unison and are always the driven members of the spring clutches.

The main drive pinion 92 is integral with the shaft 73 and is in constant mesh with a gear 93 on the countershaft 80. Intermediate gear 94 surrounds and has free bearing on the spring clutch sleeve 84 and is in constant mesh with the countershaft gear 96. Low speed gear 97 surrounds, and has free bearing on the spring clutch sleeve 84 and is in constant mesh with a gear 98 on the countershaft 80. The three countershaft gears 93, 96 and 98 are integral. A spacing sleeve 100 takes up the unused part of the countershaft 80. The pinion 92 has a spring clutch cup 99 integral. The gear 94 likewise has a spring clutch cup 101 integral. Gear 97 is itself hollowed out to serve as a spring clutch cup at 102. The three spring clutch cups 99, 101, and 102 always rotate at different speeds and are always the driving members of the spring clutches.

The operative mechanism of the intermediate clutch 85 contained within the intermediate driving clutch cup 101 and the intermediate driven clutch cup 89 comprises the intermediate clutch spring 103. (See enlarged view of intermediate clutch Fig. 17.) Spring 103 is preferably made of rectangular bar stock the cross section of which has greater breadth than height. Spring 103 is accurately machined and has an outside diameter preferably about one-two hundredth of an inch less than the inside diameter of the cups 101 and 89, leaving the space 105 between the spring and the cups. A pin 104 in the wall of the driving cup 101 extends into a hole in the spring 103 and positively rotates it in unison with the driving cup 101. A frustro-conical flanged ring 106 is pinned at 107 to the spring 103 and is thereby also positively driven by the driving clutch cup 101. Two other frustro-conical rings 108 and 109 surround the clutch sleeve 84. Two cages 111 and 112 also surround the clutch sleeve 84 and each hold a series of steel balls 113 and 114 respectively circumferentially spaced apart, but allow limited radial movement of the balls. The two rings 108 and 109 are urged axially in opposite directions against the balls 113 and 114 respectively by the spring 116, normally leaving the space 117 between the two rings and a space 118 between the adjacent frustro-conical surfaces of the rings 106 and 109. A small space 119 is normally left between the end of the flanged ring 106 and the driven cup 89. Ring 108 is kept rotating in unison with driving cup 101 by pin 121, while ring 109 is kept rotating in unison with the driven cup 89 by the small key 122.

The operative mechanism of the high speed spring clutch 75, contained within the high speed driving clutch cup 99 and the high speed driven clutch cup 88 comprises a clutch spring 110 and also in other respects is precisely like that of the intermediate spring clutch 85 hereinbefore described except that, inasmuch as it revolves more rapidly, the several parts are all smaller. The parts of the high speed clutch, though shown in the drawings, are therefore not given numerals and are not further described. The low speed spring clutch 95 contains nothing within the driving cup 102 and the driven cup 91 except the spring 123, which is accurately machined and normally has an outside diameter several thousandths of an inch larger than the inside diameter of the cups 102 and 91 which contain it. Clutch 95 always becomes operative upon mere reversal of direction, like any overrunning clutch, and has no other operative mechanism.

The outside surfaces of high speed driving clutch cup 99 and high speed driven clutch cup 88 have fine clutch teeth 124 and 126 cut upon them respectively. (See Fig. 1). A flange 127 integral with gear 94 has corresponding clutch teeth 128. A grooved collar 129 normally on the teeth 126 has corresponding internal clutch teeth, and is slidable axially to three positions so that the extreme forward end of its movement it connects cup 99 to cup 88 whereby they rotate in unison no matter which becomes the driver, while at the other end of the movement it connects cup 88 to the flange 127 so that they rotate in unison no matter which becomes the driver.

On the outside surface of low speed driven clutch cup 91 fine clutch teeth 131 are cut. Corresponding clutch teeth 132 are cut on an enlarged part 133 of main shaft 81. A sliding gear 134, having a grooved collar 136 integral, has internal clutch teeth partway only of its length corresponding to the teeth 131 and 132, and is slidable axially thereon to three positions, so that at the extreme forward end of its movement it is entirely on the cup 91 and in engagement only with the teeth 131 and therefore does not connect any two parts. At its middle position, shown in Fig. 1 it connects the cup 91 and the enlarged part 133 of shaft 81. At its extreme rearward position its toothed interior engages only the teeth 132 on the enlarged part 133 of the shaft 81. But in its extreme rearward position the sliding gear 134 is in mesh with a reversing idler gear 137. (See Figs. 15 and 16). Reversing idler gear 137 has integral therewith the idler gear 138 which is in constant mesh with the gear 98. (See Figs. 14 and 16). Integral idler gears 137 and 138 revolve about the stationary idler shaft 139 supported in hubs 141 in the transmission housing 79.

A shifting fork 142 engages the groove in the collar 129 and a similar shifting fork 143 engages the groove in the collar 136. Shifting fork 142 is attached to high and intermediate shifting bar 144 at 146 (see Fig. 2), while the reverse shifting fork 143 is attached to reverse shifting bar 147 at 148. The H control lever 149 operates in the usual manner, that is, when the ball 151 is moved over into the notch 152 of bar 144 and the top end of the lever 149 is pushed forward, the bar 144 pulls the fork 142 rearward, and positive connection is established by collar 129 between cup 88 and the flange 127 of intermediate gear 94, and, while the ball 151 remains in the notch 152, if the top end of the lever 149 is pulled rearward, the bar 144 pushes the fork 142 forward, and positive connection is established by collar 129 between cup 88 and cup 99 of high speed pinion 92. Similarly when the ball 151 is moved over into the notch 153 of the bar 147, and the top end of the lever 149 is pushed forward, the bar 147 pushes the fork 143 rearward, and shifts the sliding gear 134 to its most rearward position, where it connects the shaft 81 to the gear 98 through the reversing idlers 137 and 138. When the lever is shifted to its opposite extreme, the sliding gear 134 will be entirely on the cup 91 and in this position the shaft 81 is drivably disconnected from the transmission. In the central position of the H control lever 149, which is the position shown in the drawing, the cup 91 and the shaft 81 are drivably connected. Detents 154 are provided to maintain the shifting bars in their several positions as in common practice.

Inasmuch as the spring clutch sleeve 84 is rotatable on the rotatable shaft 81, it is advisable that it be lubricated interiorly from a reservoir 156 centrally located partly in the shaft 81 and partly in the shaft 73. But it is not a simple matter to keep a reservoir in the center of a rotating shaft filled. To obviate this difficulty the two splash cups 157 (see Figs. 1, 2 and 12) are cast integral with the transmission housing 79 near its cover 158. A narrow transferring reservoir 159 cored in the flywheel cover 78 surrounding the shaft 73 (see Figs. 1, 2 and 13) is kept filled by the two splash cups 157 through the holes 161. The reservoir 156 in the center of the shaft 81 and 73 is decreased in diameter at the ends as at 162 and 163. Cross holes 164 connect the transferring reservoir 159 to the main reservoir 156 through the hole 162. Other cross holes 166 at the opposite end connect the main reservoir 156 to the interior of the transmission housing through the holes 163. Other cross holes 167 extend outwardly from the central reservoir 156 to the rotatable parts to be lubricated. The countershaft 80 is nonrotatable and has the central reservoir 168 kept supplied through the holes 169. Cross holes 171 convey the oil to the parts to be lubricated. Oil escape grooves 172 and 173 surround shafts 73 and 81 at opposite ends of the transmission, and oil return holes 174 and 176 connect these grooves with the interior of the housing 79.

The operation of the transmission may best be described by assuming a definite R. P. M. range for the engine with definite vehicle M. P. H. for the given engine speeds, and selecting definite speeds at which the automatic features of the transmission function. Accordingly it will be assumed, for illustrative purposes only, that the engine will idle down to three hundred R. P. M. and that it has a top speed of thirty six hundred R. P. M.; that at its top speed it drives the vehicle at seventy-two M. P. H. when the transmission is in high gear, thirty-six M. P. H. in intermediate, and eighteen M. P. H. when in low gear; that the weight and springs of the centrifugal clutch 25 are such that it engages and effectuates low gear at four hundred engine R. P. M. or two M. P. H.; that when the vehicle is being driven in low gear anywhere between eight and eighteen M. P. H., automatic change in ratio to intermediate gear may be had; and that when the vehicle is being driven in intermediate gear anywhere between sixteen and thirty-six M. P. H., automatic change in ratio to high gear may be had. With these values so fixed the operation of the centrifugal clutch 25 may preferably be first described. The operation is as follows:—

Below four hundred engine R. P. M. the centrifugal clutch 25 is disengaged, because the clutch weights 42 lie close to the axis as in Fig. 3, whereby the clutch shoes 29 have their facings 33 pulled slightly away from the drum 70 leaving the spaces 77 between the facings and the drum. The shoes then revolve about the axis without carrying the drum with them.

When the operator by means of the engine throttle, raises the engine speed to four hundred R. P. M., the force of the weights 42 overcomes the springs 62 and the weights fly out from the axis. Now at four hundred R. P. M. the weights 42 exert an outward force of about fifty pounds each, and this would be entirely insufficient to drive the drum if it were not for the fact that the leverage between the weights 42 and the shoes 29 is ten to one. But with a ten to one leverage, the fifty pound force which each weight exerts applies a five hundred pound pressure to each shoe. This is sufficient to drive the drum to move the vehicle at two M. P. H. in low gear.

But it must be remembered that centrifugal force increases as the square of the revolutions. If then the weights each exert fifty pounds at four hundred engine R. P. M., then at thirty-six hundred engine R. P. M. they will exert, not nine times as much, but eighty-one times as much, which will be four thousand and fifty pounds. Now if the ten to one linkage between the weights 42 and the shoes 29 were still effective, the outward pressure between the shoes 29 and the drum 70 would be over forty thousand pounds which would be too great for a drum of ordinary dimensions to withstand. But the mechanism provides a relief from the ten to one linkage as soon as the outward force on the shoes 29 becomes as much as one thousand pounds per shoe, which it does at about five hundred sixty-five R. P. M. of the engine, for at this pressure the springs 59 yield, and the nuts 58 raise off the swivel blocks 40 as in Fig. 4, whereupon the weights 42 nest closely into the inside of the shoes 29, after which the force of the weight against the shoe is no longer multiplied by ten but on the contrary each pound of force of the weight applies only one pound of force to the shoe.

It will be seen that while the ten to one linkage provided by the eccentric 49 and the connecting rods 52 is quite necessary and highly effective in providing adequate pressure on the shoes 29 at the lower engine speeds, it is just as essential that this same ten to one linkage be rendered ineffective at the higher engine speeds, and the simple mechanism whereby this is accomplished is considered one of the valuable features of this invention. The centrifugal clutch, however, merely connects and disconnects the engine to and from the transmission. The automatic shifting of gear ratios and free-wheeling is accomplished by the mechanism within the housing 79.

When the engine is first started, the H control lever should be in the position which, in a standard transmission, represents low gear. In this position the sliding gear 134 will be wholly on the cup 91 and therefore entirely ineffective to transmit motion. The engine may then be raced to warm it up and even though the centrifugal clutch 25 engages when the engine passes four hundred R. P. M., there is no connection to the main shaft 81 and the vehicle is consequently not moved.

After the engine is warmed up, if free-wheeling and automatic-gear-ratio-changing is desired, the H control lever should be placed in the position which, in a standard transmission, is known as neutral. This is the central position in which the lever is shown in Fig. 1. In this position the main shaft 81 and the three driven clutch cups 91, 89 and 88 are all connected together and therefore revolve in unison. Which of the gear ratios will now be in effect will depend upon which of the driving cups 102, 101 or 99 is driving its driven cup.

Inasmuch as the spring 123 fits its cups snugly, the clutch 95 is always effective, that is, the cup 102 always drives the cup 91 except when the cup 91 runs ahead of the cup 102. But inasmuch as the springs 103 and 110 are both smaller than their cups, neither of the spring clutches 85 or 75 are normally effective but are only effective when the operator elects to have them so, and he may not, by electing, make intermediate clutch 85 effective when moving less than eight M. P. H. nor may he, by electing, make high speed clutch 75 effective when moving less than sixteen M. P. H.

When the low speed clutch 95 is effective the main shaft 81 is driven through gears 92, 93, 98 and 97 at one-fourth engine speed. When by choice the operator makes the intermediate clutch 85 effective, the main shaft 81 is driven through gears 92, 93, 96 and 94 at one-half engine speed and the clutch 95 overruns. When by choice the operator makes the high speed clutch 75 effective, the main shaft 81 is driven directly, without gearing, at engine speed, and the clutches 95 and 85 both overrun, that is, when in high gear, the driven cup 91 of the low speed clutch is revolving at engine speed but its driver 102 is revolving only one-fourth engine speed, and the driven cup 89 of the intermediate clutch is revolving at engine speed but its driver 101 is revolving only one-half engine speed. The manner in which the intermediate clutch 85 is made to become operative at the election of the operator is best illustrated in Figs. 17 to 19.

When, with the H control lever still in the position shown in Fig. 1, the centrifugal clutch 25 first engages, and, through low gear, moves the vehicle two M. P. H., the intermediate spring clutch 85 appears as in Fig. 17, that is; there is a gap 117 between the members 108 and 109; there is the slight space 118 between the members 106 and 109; there is a slight space 119 between the member 106 and the end wall of the cup 89; and there is a slight space 105 between the spring 103 and the cups 101 and 89.

The intermediate clutch will act to cause the driving cup 101 to revolve the driven cup 89 through the spring 103, when the larger balls 114, by moving radially outward and pushing the member 109 toward the smaller balls 113, close the space 118 and apply friction to the member 106 to unwind the spring 103 and thereby close the space 105. But it would be extremely undesirable to have the spring 103 unwind and join the cups 101 and 89 as long as the driving cup 101 is revolving twice as fast as the driven cup 89, because this type of clutch engages instantly. But the cooperation of the two sets of independently movable balls 113 and 114 prevents engagement of the clutch 85 until the operator, by releasing his accelerator, reduces the speed of the engine and consequently of the driving cup 101 to half, while the momentum of the vehicle maintains the speed of the driven cup 89 constant. When he brings the speed of the driving cup 101 to or below the speed of the driven cup 89 then, and then only, may the balls 114 fly out and make the clutch effective.

At four and one-half M. P. H. some of the parts of clutch 85 shift to the positions shown in Fig. 18, that is, the balls 113 fly out, the member 108 moves toward the member 109 and the gap 117 is closed. The reason why the somewhat smaller balls 113 act before the larger balls 114 is because they revolve twice as fast as the larger balls and therefore have nearly four times the power, and therefore overcome the spring 116 first.

It will be noticed that in Fig. 18 the space 105 is not yet closed, therefore the intermediate clutch 85 is not yet effective.

At eight miles per hour the larger balls 114 have sufficient centrifugal force to fly out, move the member 109 axially and overcome the spring 116, but they are prevented from doing so because the gap 117, Fig. 17, has been previously closed by the smaller balls 113. The gap 117 will always be closed by the smaller balls 113 before the larger balls 114 have power enough to act, and it will then remain closed indefinitely and thereby keep the clutch disengaged as long as the operator keeps the engine driving, or does not drop it back to half the speed at which it revolved when it was driving.

Anytime while the transmission is operative in low gear and the vehicle is moving over eight M. P. H., the operator may suddenly release his accelerator and drop his engine speed to one-half of what it was when it was driving the vehicle, and the parts of the clutch 85 will assume the positions shown in Fig. 19, that is, since the slightly smaller balls 113 were now revolving no faster than the larger balls 114, the larger overcame the smaller, the larger moved radially outward and the smaller radially inward, both members 108 and 109 moved axially toward the smaller balls, closed the space 118, Fig. 18, applied friction to the member 106 to shorten the spring 103. This friction will wind the spring 103 smaller if the driving cup 101 happens to be dropped below the speed of the driven cup 89 but it will unwind it larger and engage the clutch at the exact instant that the speed of the driving cup 101 reaches and tries to pass the speed of the driven cup 89. In Fig. 19 the spring 103 is shown expanded to fit the cups 101 and 89 as it appears when the cup 101 is driving the cup 89.

Bar stock of rectangular cross section is used for spring 103 because with the length of the rectangle lengthwise of the spring sufficient friction will be had between the members 106 and 109 without making the spring so much shorter, and the spring will unwind to a given increased diameter with less applied friction on the ends than when square stock of the same sectional area is used.

The high speed clutch 75 operates precisely like the intermediate clutch 85 except that it becomes engaged at twice the R. P. M., and for that reason the balls need be only one-fourth the weight as the intermediate set of balls to have the same force. It may be engaged in the same manner as the intermediate clutch except that after eight miles per hour, release of the accelerator operates the intermediate clutch, while the high speed clutch will not operate until after a vehicle speed of sixteen M. P. H. is reached.

If, because the pavement is wet or icy, or because of extended down-hill driving, the operator chooses not to have free-wheeling or automatic speed ratio shifting, he needs only to operate the H control lever 149 to the 5 positions corresponding to those provided in a standard transmission for high and intermediate gear, and when he has shifted to the "high" position he will have positively connected cup 99 to cup 88 by the collar 129 whereby the engine is joined directly to the main shaft 81 without gearing and without free-wheeling, and when in the intermediate position he will have positively connected cup 88 to flange 127 with the same collar 129, whereby he connects the main shaft 81 directly to the gear 94 through the sleeve 84, whereby it is driven at half engine speed but without free-wheeling.

To reverse the vehicle, the operator merely pushes his H control lever to a position corresponding to that provided for reversing in a standard transmission. By doing so he shifts the sliding gear 134 rearward, to the rear end of the enlarged part 133 of the shaft 81 where its teeth engage those of the idler gear 137, Figs. 15 and 16.

Inasmuch as there is no foot operated clutch, it is obvious that the operator must reduce the engine to its idling speed to stop the transmission gears before he may shift into reverse gear. Also when using the H control lever to shift into conventional intermediate it is preferable that the operator, by means of his accelerator, should shift into automatic free-wheeling intermediate, for then he would slide his gear shift lever into positive connection with absolutely no clashing, because the two parts which he must connect are revolving in unison. The same is true of shifting into conventional high gear.

The gear 92 revolves whenever the centrifugal clutch 25 is in engagement, and oil is thereby splashed into the cups 157, from which it flows through the holes 161 into the reservoir 159, so that the reservoir 159 is always filled. Whenever the centrifugal clutch 25 disengages and shaft 73 ceases to rotate, the oil flows by gravity through holes 164 and 162 into central reservoir 156, the air in the shaft passing out through holes 163 and 166 at the other end. When the shafts 73 and 81 again rotate, of course there will be a pumping action due to the revolving cross holes 164 and 166 to pump the oil from the reservoir 156 back into the reservoir 159. But this pumping action is not effective to remove from the reservoir 159 a thin layer of oil which centrifugal force holds around its outer surface while it revolves. Some of the oil that flows into reservoir 159 will each time be pumped back but enough will remain to supply the outlet holes 167 each time the shaft 73 starts and stops.

One of the chief advantages of driving a vehicle having the transmission mechanism herein described is that the operator need never remove his one foot from the accelerator pedal, thus leaving his other foot always on the brake pedal. He need rarely remove either hand from the steering wheel. After starting his engine and racing it for several seconds he drops it to idling speed then sets his gear shift lever in the center. If the need for reaching the maximum vehicle speed is now extremely urgent he may, as rapidly as possible, bring his vehicle up to eighteen M. P. H. in low gear, release his accelerator for one second while the vehicle free-wheels, depress the accelerator and bring the vehicle up to thirty-six M. P. H. in intermediate gear, again release his accelerator for one second, while the vehicle free-wheels, then depress it until the vehicles reaches its maximum speed of seventy-two M. P. H. in high gear.

On the other hand if he is in no hurry he may accelerate to eight M. P. H. in low gear, change to intermediate, accelerate to sixteen M. P. H. in intermediate and change to high gear. Again he may wish to retain low gear throughout continued uphill driving. This he may do and drive anywhere between two and eighteen M. P. H. Or he may desire to indefinitely retain intermediate gear ratio, which he may do and drive anywhere from four to thirty-six M. P. H. All of these options the operator may chose from, and all without shifting a lever, pressing a button, or removing his foot entirely from the accelerator pedal.

If at any time the vehicle is being driven up a steep hill in high gear, and the hill is so steep that the vehicle is gradually pulled down to a speed of less than sixteen M. P. H., the high speed clutch, without help from the operator, lets go, and the load is taken up by the intermediate clutch, the engine now revolving twice as fast for the same vehicle speed. If now the hill is still too steep to be driven in intermediate gear and the vehicle is slowed down to less than eight M. P. H., the intermediate clutch, without any help from the operator, lets go, and transfers the load to low gear, letting the engine again double its speed.

It will of course be understood that the M. P. H. at which automatic speed-ratio shifting takes place has herein been selected arbitrarily, and that it may be changed to correspond to the need of each individual application. Likewise the gear ratios of one to one, two to one and four to one used for high, intermediate and low are only approximately those commonly used, the even ratios being herein used to facilitate description.

Automatic automotive gear ratio shifting devices are concededly numerous but it is thought to be broadly new in a mechanism wherein one member may drive another either through reduction gearing or directly, to provide means urging change from gear to direct connection of the two members after a certain R. P. M. is exceeded together with means restraining operation of the first means only until the operator choses to allow the driven member to continue by momentum while he reduces the driving member to a speed synchronous with the driven member. Having this view of the scope of the invention,

I claim,

1. The combination, in automotive transmission mechanism, of a power operated driving member, a load resisted driven member, reduction gearing operated by said driving member, whereby said driven member is driven by said gearing but may overrun said gearing, means operable into engagement to connect said driving and driven members directly, a speed responsive means for operating said connecting means into engagement, and a second speed responsive means operative to detain operation of the first speed responsive means until the driving member is brought to a speed synchronous with that of the driven member.

2. The combination, in automotive transmission mechanism, of a power operated driving member, a load resisted driven member, reduction gearing operated by said driving member, means whereby said driven member is driven by said gearing but may overrun said gearing, means automatically operative to connect said driving and said driven members directly, a centrifugal means carried on and rotated by said driven member operative to engage said connecting means after a predetermined revolution speed of the driven member is exceeded, and a second centrifugal means carried on and rotated by said driving member operative to detain operation of the first centrifugal means except when the driving member is brought to or below the speed of the driven member.

3. The combination, in automotive transmission mechanism, of a power operated driving member, a load resisted driven member, reduction gearing operated by said driving member, means whereby said driven member is driven by said gearing but may overrun said gearing, an overrunning clutch automatically operable into engagement to connect said driving member to directly drive said driven member but to permit said driven member to overrun said driving member, a speed responsive means for operating said overrunning clutch into engagement, and a second speed responsive means for rendering the first said speed responsive means ineffective except when the driving member is brought to a speed synchronous with the driven member.

4. The combination, in automotive transmission mechanism, of a power operated driving member, a load resisted driven member, a gear train having a driving gear for said driving member and a driven gear operative to drive said driven member at a lesser speed than said driving member, an overrunning clutch for permitting said driven member to overrun said gear train, a second overrunning clutch automatically operable into engagement to connect said driving member to said driven member independently of said gear train whereby said driving member revolves said driven member directly, but said driven member may overrun said driving member, a speed responsive means rotatable with said driven member for operating said second clutch into engagement when said driven member exceeds a predetermined rotative speed, and a second speed responsive means rotatable with said driving member operative to prevent engagement of said second clutch as long as said driving member exceeds the speed of said driven member, but operative to permit engagement of said second clutch as soon as said driving member is brought into synchronism with said driven member.

5. The combination, in automotive transmission mechanism, of a housing, a main shaft and a parallel spaced apart countershaft within said housing, a driving gear surrounding said main shaft, a countershaft gear in constant mesh with said driving gear, a second countershaft gear axially spaced apart from the first countershaft gear connected thereto to revolve in unison therewith, a load resisted driven gear surrounding said main shaft in constant mesh with said second countershaft gear, said driven gear being connected in driving relation with said main shaft but having an overrunning clutch in the connections permitting said main shaft to overrun said driven gear, a second overrunning clutch surrounding said main shaft between said driving and said driven gears normally disengaged but operable into engagement to connect said driving gear to revolve said main shaft in unison with it independently of said gearing, but to permit said main shaft to overrun said driving gear, centrifugal means, operable when said main shaft revolves beyond a predetermined speed, for engaging said second overrunning clutch, and a second centrifugal means operative to prevent engagement of said second overrunning clutch as long as said driving gear revolves faster than said main shaft.

6. The combination, in automotive transmission mechanism, of a housing, a main shaft and a parallel spaced apart countershaft within said housing, three spaced apart gears comprising a high speed driving gear, an intermediate speed driven gear and a low speed driven gear surrounding said main shaft, three countershaft gears connected to revolve in unison with each other in constant mesh with the three said gears on the main shaft, three overrunning clutches, one for each said gear on the main shaft, all operable to connect their respective gears to drive the main shaft but to permit said main shaft to overrun said gears, the low speed clutch being engageable at any speed, the intermediate speed clutch being engageable only after a predetermined speed is passed and the high speed clutch being engageable only after a still higher predetermined speed is passed, automatic means operable to engage the intermediate speed clutch when its predetermined speed is passed, a second automatic means to prevent operation of the first automatic means unless and until the intermediate speed gear is brought to the speed of the main shaft, a third automatic means operable to engage the high speed clutch when its predetermined speed is passed, and a fourth automatic means to prevent operation of the third automatic means unless and until the high speed gear is brought to the speed of the main shaft.

7. The structure defined in claim 6 having in addition thereto means manually shiftable for connecting the said intermediate speed gear in direct driving relation with said main shaft for preventing said main shaft overrunning said intermediate gear, and means manually shiftable for connecting the said high-speed driving gear in direct driving relation with said main shaft for preventing said main shaft overrunning said high-speed driving gear.

8. The combination, in automotive transmission mechanism, of a housing, a main shaft and a parallel spaced apart countershaft within said housing, three spaced apart gears comprising a high-speed driving gear, an intermediate-speed driven gear, and a low-speed driven gear surrounding said main shaft, three countershaft gears connected to revolve in unison with each other in constant mesh with the three said gears on the main shaft, a clutch sleeve surrounding the main shaft, three overrunning clutches, one for each of the main shaft gears, all operable to connect their respective gears to drive the said clutch sleeve but to permit said clutch sleeve to overrun said gears, the low-speed clutch being engageable at any speed, the intermediate-speed clutch being engageable only after a predetermined speed is exceeded, and the high-speed clutch being engageable only after a still higher predetermined speed is exceeded, automatic means operable to engage the intermediate speed clutch when its predetermined speed is exceeded, a second automatic means to prevent operation of the first automatic means unless and until the intermediate-speed gear is brought to a speed synchronous with the clutch sleeve, a third automatic means operable to engage the high-speed clutch when its predetermined speed is exceeded, a fourth automatic means to prevent operation of the third automatic means, unless and until the high-speed gear is brought to a speed synchronous with the clutch sleeve, and means manually shiftable into and out of engagement to connect said clutch sleeve to or from said main shaft.

9. The structure defined in claim 8 having in addition thereto an idler gear driven by a gear on said countershaft, and a mating gear for said idler gear carried by said manually shiftable means and slidable into engagement with said idler gear when said manually shiftable means is shifted in the one direction for disconnecting said main shaft from said clutch tube for forward rotation thus connecting said main shaft through said idler gear for backward rotation.

10. The structure defined in claim 9 having in addition thereto an idler gear driven by a gear on the countershaft, external splines on the clutch tube, corresponding external splines on the main shaft, a sliding gear having internal splines corresponding to the said external splines on the clutch tube and the main shaft, said sliding gear being shiftable by said manual means fully on the clutch tube for disconnecting the clutch tube and the main shaft, partly on the clutch tube and partly on the main shaft for connecting them together, and fully on the main shaft in which position the sliding gear is in mesh with the idler gear for revolving the main shaft oppositely of the clutch sleeve.

11. The combination, in automotive transmission mechanism, of an engine, a main shaft connectable directly or by gearing to said engine, a high, intermediate, low, and reverse gear for driving said main shaft, automatic means for connecting said low gear to overrunningly drive said main shaft when a predetermined engine speed is exceeded, automatic means for connecting said intermediate gear to overrunningly drive said main shaft when a predetermined low-gear speed is exceeded, and the intermediate gear is reduced to synchronism with it, automatic means for connecting said high gear to overrunningly drive said main shaft when a predetermined intermediate gear speed is exceeded and the high gear is brought to synchronism with it, and selective manual means operable for connecting said high or intermediate gear directly to said main shaft to obviate overrunning, for connecting said reverse gear to said main shaft, or for disconnecting all of said gears from said main shaft, the automatic overrunningly connectable means being operative only when said manual means is in a neutral position.

12. The combination, in automotive transmission mechanism, of a revolving cylindrical driving member, a coaxial revolvable cylindrical driven member, speed reducing gearing operated by the driving member, means whereby the driven member is connected to be revolved by said gearing but may overrun said gearing, a helical spring coaxial with said cylindrical driving and driven members, opposite ends of said spring fitting the cylindrical surfaces of said members loosely, centrifugal means associated with said driven member operative at a predetermined driven member speed to cause said spring to fit said cylindrical surfaces closely and automatic means associated with said driving member operative to prevent the operation of the said centrifugal means unless and until the driving member speed is brought to the driven member speed, the helix of said spring being such that the spring is drawn in closer contact with said cylindrical surfaces by increased resistance of the driven member to being directly driven by the driving member.

13. The structure defined in claim 12 in which the said centrifugal means applies rotative friction to one end of the spring whereby the diameter of the spring is made larger or smaller as the rotative speed of one said cylindrical member exceeds or lags behind the other.

14. The combination, in automotive transmission mechanism, of a hollow driving cylinder, a coaxially adjacent hollow driven cylinder, speed reducing gearing operated by the driving cylinder, means whereby the driven cylinder is connected to be revolved by said gearing but may overrun said gearing, a helical spring having opposite ends fitted to the interior surfaces of said coaxially adjacent cylinders loosely, a speed responsive means associated with said driven member for enlarging said helical spring at a predetermined driven member speed to fit said interior surfaces tightly and automatic means, associated with the driving member, operative to prevent the said speed responsive means from expanding said spring unless and until the driving member speed is brought to the driven member speed, the helix of said spring being such that increased driving force between the driving and the driven cylinders expands said spring to still more tightly fit the interior of said cylinders.

15. The structure defined in claim 14 in which the said speed responsive means applies axial frictional pressure to said spring whereby it is uncoiled to enlarge its diameter when the speed of the driving cylinder exceeds that of the driven cylinder and coiled to decrease its diameter when the speed of the driven cylinder exceeds that of the driving cylinder.

16. The structure defined in claim 14 in which the driving cylinder, the driven cylinder, and the end of the driven gear are all axially adjacent and all have corresponding external clutch teeth, and a collar having corresponding internal clutch teeth manually shiftable to a middle position to be entirely on the driven cylinder, in one direction to be partly on the driving and partly on the driven cylinders, and in the other direction to be partly on the driven cylinder and partly on the driven gear.

17. The combination, in automotive transmission mechanism, of a cylindrical driving member, a coaxially adjacent cylindrical driven member, speed reducing gearing operated by the cylindrical driving member, means whereby the cylindrical driven member is connected to be rotated by said gearing but may overrun said gearing, a helical spring having opposite ends fitted loosely to the cylindrical surfaces of the driving and driven members respectively, an axially movable friction member carried by said cylindrical driven member for applying frictional pressure to said spring to enlarge or decrease the diameter of said spring as one cylindrical member exceeds or lags behind the speed of the other, a second axially movable member carried by the driving member movable to obstruct the movement of the first axially movable member, speed responsive means carried by the driven member operative at a predetermined speed to move the axially movable friction member to apply friction to said spring, and automatic means carried by the driving member operative to move and maintain the second axially movable member in its obstructing position as long as the speed of the driving member exceeds that of the driven member.

18. The combination, in automotive transmission mechanism, of a rotatable cylindrical driving member, a coaxially adjacent rotatable cylindrical driven member, reduction gearing operated by the driving member, means whereby the cylindrical driven member is connected to be rotated by said gearing but may overrun said gearing, a helical spring coaxial with said driving and driven members having one end secured to said driving member for rotation therewith, the other end being fitted loosely to said cylindrical driven member, a centrifugally operated friction applying governor carried by said driven member for engaging the free end of said spring whereby said spring is coiled to a smaller or uncoiled to a larger diameter as one of the said rotatable cylindrical members exceeds or lags behind the other, and automatic means operative to lock and maintain the said governor in its unoperated position whenever and as long as the driven member is being driven through said reduction gearing.

19. The combination, in automotive transmission mechanism, of a driving gear, a driving clutch-member connected directly to said driving gear, a driven clutch-member, a driven gear, an overrunning clutch connecting said driven clutch-member and said driven gear yet permitting said driven clutch-member to overrun said driven gear, normally inoperative clutching means between said driving clutch-member and said driven clutch-member, two centrifugal governors, one secured for rotation to the driving clutch-member and the other to the driven clutch-member, the driven governor having a normal operative speed at which it renders said normally inoperative clutching means effective, and the driving governor being operative to lock and prevent action of the driven governor at its operative speed if the said driving clutch-member is then exceeding the rotative speed of the driven clutch-member.

20. An automatic automotive transmission comprising, in combination, a main shaft, a countershaft, a clutch sleeve surrounding the main shaft having a low, an intermediate and a high speed driven clutch member secured thereto to rotate in unison, a low, an intermediate, and a high speed driving clutch member independently rotatable on the main shaft one adjacent each driven clutch member, three main shaft gears one drivably secured to each driving clutch member, three countershaft gears secured together to rotate in unison one in mesh with each of the main shaft gears, overrunning members for connecting the several driving and driven clutch members, the low speed overrunning member being always operative to permit the driven member to overrun the driving member, the intermediate and the high speed overrunning members being normally inoperative in any direction of rotation to connect their driving and driven clutch members, a pair of centrifugal governors for the intermediate clutch and a similar pair for the high speed clutch, one governor of each pair being adapted to render the normally inoperative overrunning member operative at or above a certain speed and the second governor of each pair being operative to oppose and prevent action of the first said governor except when the driving clutch member is reduced in speed to that of the driven clutch member.

21. The structure defined in claim 20 having manually operable means for making positive non-overrunning connection between the high or the intermediate main shaft gears and the clutch sleeve, and manual means for positively connecting or disconnecting the clutch sleeve to or from the main shaft.

22. In automatic automotive transmission mechanism, a rotatable driving member, a rotatable driven member, gearing operated by said driving member to rotate said driven member at a lower speed than said driving member, means to permit said driven member to overrun and exceed the speed at which it is being driven by said gearing, a clutch operable into engagement to connect said driving to said driven member directly independently of said gearing, clutch engaging means to effect engagement of said clutch at a predetermined revolution speed, and a centrifugal governor to restrain operation of said clutch engaging means until the rotative speed of the driving member is reduced below the speed at which it is rotating when it is driving the driven member thru said gearing.

In testimony whereof I affix my signature.

FREDERICK W. COTTERMAN.